United States Patent
Kale et al.

(10) Patent No.: US 9,522,588 B2
(45) Date of Patent: Dec. 20, 2016

(54) REAR TWIST BEAM WITH BULGED MIDDLE SECTION

(71) Applicant: MAGNA INTERNATIONAL INC., Aurora (CA)

(72) Inventors: Suresh Raghunath Kale, Maharashtra (IN); Punith Jagadish Kumar, Karnataka (IN); Dhiren Behera, Maharashtra (IN); Prasad Rao, Karnataka (IN); Gundappa Vallishan, Karnataka (IN)

(73) Assignee: Magna International Inc. (CA)

( * ) Notice: Subject to any disclaimer, the term of this patent is extended or adjusted under 35 U.S.C. 154(b) by 0 days.

(21) Appl. No.: 14/774,330

(22) PCT Filed: Feb. 24, 2014

(86) PCT No.: PCT/CA2014/000140
§ 371 (c)(1),
(2) Date: Sep. 10, 2015

(87) PCT Pub. No.: WO2014/138850
PCT Pub. Date: Sep. 18, 2014

(65) Prior Publication Data
US 2016/0016453 A1    Jan. 21, 2016

(30) Foreign Application Priority Data
Mar. 14, 2013    (IN) .......................... 1106/CHE/2013

(51) Int. Cl.
*B60G 21/055*    (2006.01)
*B60G 21/05*    (2006.01)

(52) U.S. Cl.
CPC ......... *B60G 21/051* (2013.01); *B60G 2200/23* (2013.01); *B60G 2206/16* (2013.01);
(Continued)

(58) Field of Classification Search
USPC .... 280/124.106, 124.137, 124.149, 124.152, 280/124.166
See application file for complete search history.

(56) References Cited

U.S. PATENT DOCUMENTS

| | | | | |
|---|---|---|---|---|
| 2,685,479 A | * | 8/1954 | Buckendale | ............ B60B 35/08 301/124.1 |
| 6,086,162 A | * | 7/2000 | Pinch | ..................... B60G 3/145 228/185 |

(Continued)

FOREIGN PATENT DOCUMENTS

| | | |
|---|---|---|
| DE | 102004003152 A1 | 8/2005 |
| EP | 0755846 A1 | 1/1997 |
| GB | 1342642 A | 1/1974 |

*Primary Examiner* — James English
(74) *Attorney, Agent, or Firm* — Dickinson Wright PLLC (57) ABSTRACT

A twist beam (22) for a suspension assembly (20) comprises a base portion (44) and side walls (46) presenting an open U-shaped cross-section and a bulged middle section (24). The twist beam (22) includes end sections (56, 58), the middle section (24), and transition sections (60, 62) each extending from one of the end sections (56, 58) to the middle section (24). The width (w) and the height (h) of the twist beam (22) increase along the transition sections (60, 62) to the middle section (24). The width (w) and the height (h) of the middle section (24) are greater than the width (w) and the height (h) of the end sections (56, 58). The cross-sectional area of the bulged middle section (24) is typically 10% to 30% greater than the cross-sectional area of the end sections (56, 58).

19 Claims, 10 Drawing Sheets

(52) U.S. Cl.
CPC .... *B60G 2206/20* (2013.01); *B60G 2206/722* (2013.01); *B60G 2206/8201* (2013.01)

(56) References Cited

U.S. PATENT DOCUMENTS

| | | | | |
|---|---|---|---|---|
| 2002/0079666 | A1* | 6/2002 | Basnett | B60G 3/02 280/124.128 |
| 2002/0105159 | A1* | 8/2002 | Christophliemke | B60G 7/001 280/124.166 |
| 2003/0141757 | A1* | 7/2003 | Deletombe | B60G 11/60 301/127 |
| 2006/0017253 | A1* | 1/2006 | Kye | B60G 21/055 280/124.107 |
| 2007/0069496 | A1* | 3/2007 | Rinehart | B21D 53/88 280/124.166 |
| 2007/0246904 | A1* | 10/2007 | Murata | B60G 21/051 280/124.128 |
| 2008/0191443 | A1 | 8/2008 | Gabbianelli et al. | |
| 2010/0301577 | A1 | 12/2010 | Toepker | |
| 2012/0211961 | A1* | 8/2012 | Zhang | B60G 21/051 280/124.116 |
| 2013/0113175 | A1* | 5/2013 | Renner | B60G 21/055 280/124.106 |

* cited by examiner

FIG. 4B
SECTION VIEW A-A

FIG. 4C
SECTION VIEW A-A

REAR TWIST BEAM WITH BULGED MIDDLE SECTION

CROSS-REFERENCE TO PRIOR APPLICATIONS

This U.S. National Stage patent application claims the benefit of PCT International Patent Application Serial No. PCT/CA2014/000140 filed Feb. 24, 2014 entitled "Rear Twist Beam With Bulged Middle Section," which claims the benefit of Indian Patent Application Serial No. 1106/CHE/2013 filed Mar. 14, 2013, entitled "Rear Twist Beam With Bulged Middle Section," the entire disclosures of the applications being considered part of the disclosure of this application and hereby incorporated by reference.

BACKGROUND OF THE INVENTION

1. Field of the Invention

The subject invention relates to a twist beam for an automotive vehicle, and a suspension assembly including the twist beam.

2. Related Art

Automotive vehicles include a rear suspension assembly connecting the rear wheels together. The suspension assembly includes a pair of longitudinally control arms and trailing arms interconnected by a twist beam, also referred to as a torsion beam. Twist beams of rear suspension assemblies typically comprise a cross-section having an O-shape, C-shape, U-shape, or V-shape, which can be either open or closed. The twist beam should also be rigid enough to prevent bending yet flexible enough to allow torsion. Accordingly, the twist beam is not only a structural member, but also acts as a torsion spring. Example twist beams are disclosed in U.S. Patent Application Publication Nos. 2010/0301577, 2008/0191443, and 2012/0211961.

Twist beams experience a significant amount of stress during use in the automotive vehicle, due to twisting and other factors. Therefore, maximum stress levels, especially those due to twisting, require a minimum material thickness and thus dictate the weight of the twist beam. However, the weight of the twist beam is preferably kept as low as possible since it contributes to the total weight of the automotive vehicle.

The twist beam also controls a roll rate or roll stiffness of the vehicle, which affects the ride and handling of the vehicle. The twist beam provides the roll stiffness by twisting as the trailing arms move vertically relative to one another. The roll stiffness is analogous to a vehicle's ride rate, but for actions that include lateral accelerations, causing a vehicle's sprung mass to roll. Roll stiffness is expressed as torque per degree of roll of the vehicle sprung mass, and is typically measured in Nm/degree. The roll stiffness of a vehicle does not change the total amount of weight transfer on the vehicle, but shifts the speed at which weight is transferred and percentage of weight transferred from a particular axle to another axle through the vehicle chassis. Generally, the higher the roll stiffness on an axle of a vehicle, the faster and higher percentage the weight transfer on that axle. A slower weight transfer reduces the likelihood of vehicle rollover conditions.

The dimensions and design of the twist beam have a significant influence on the roll stiffness. Increasing the thickness of the twist beam can increase the roll stiffness, but this also increases the weight and manufacturing costs. Stabilizer bars are often times used to achieve the desired roll stiffness, especially in twist beams having an open U-shaped or V-shaped cross-section. A closed V-shaped cross-section can also provide adequate roll stiffness. However, twist beams including the stabilizer bar or closed cross-section are costly because they require a complex, controlled, and consistent manufacturing process.

SUMMARY OF THE INVENTION

The invention comprises a twist beam for a suspension assembly which provides exceptional roll stiffness with less weight and a less complex manufacturing process, compared to twist beams formed with a stabilizer bar or a closed cross-section. The twist beam includes a base portion extending longitudinally along an axis between opposite ends. The twist beam also includes a pair of side walls spaced from one another by the base portion. Each side wall extends longitudinally along the axis between the opposite ends and transversely from the base portion to a side edge. The twist beam presents a width between the side walls and a height extending from between the side edges to the base portion. Either the width or the height of the twist beam, or both, is greater along the middle section of the twist beam than at the ends. The cross-sectional area and length of the bulged middle section can be tuned to achieve the required roll stiffness and is dependent on the manufacturing process used to form the beam.

The invention also provides a suspension assembly including the twist beam.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1A:
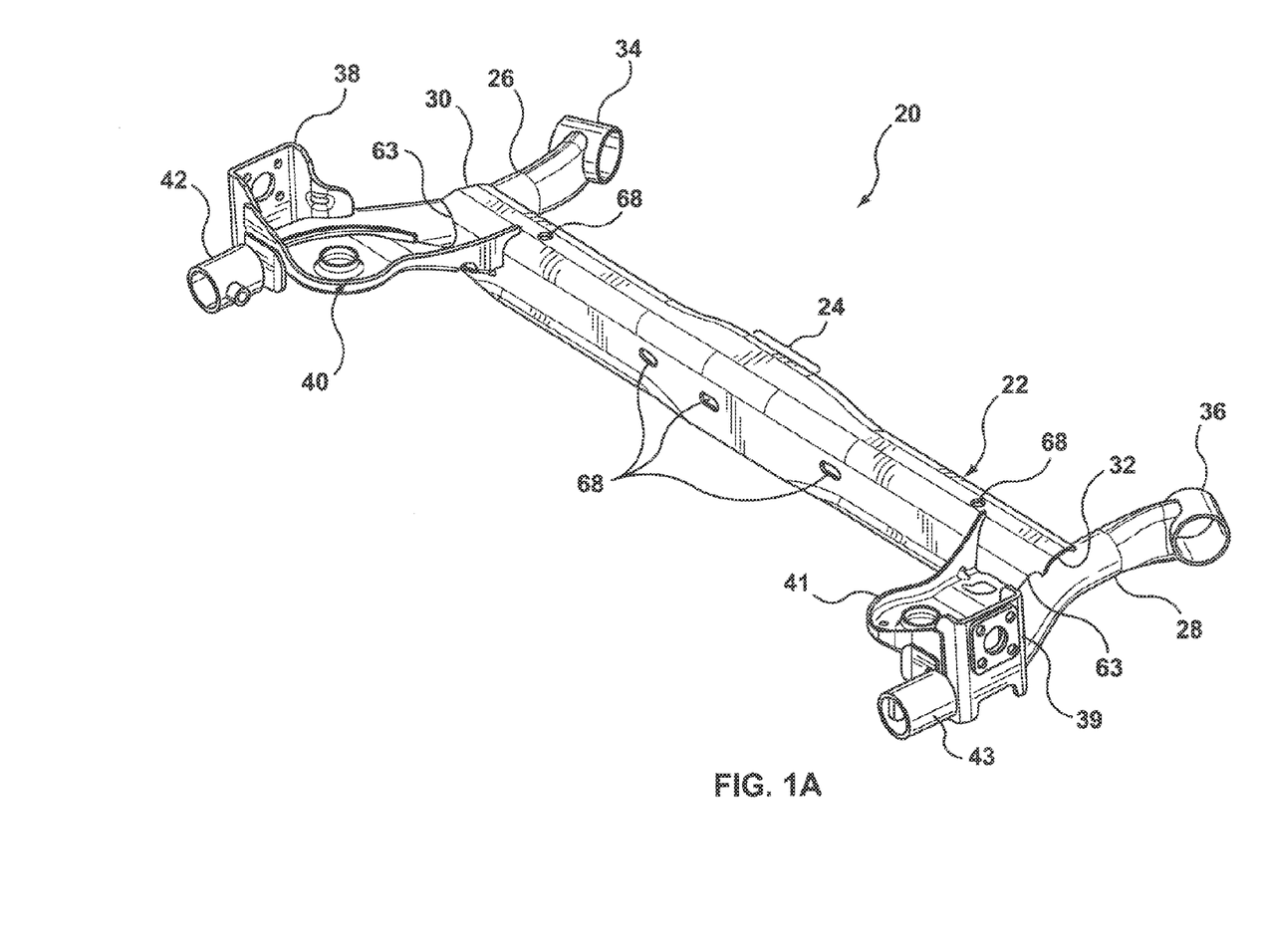
FIG. 1A is a perspective isometric view of a suspension assembly according to one embodiment of the invention.
Figure 1B:
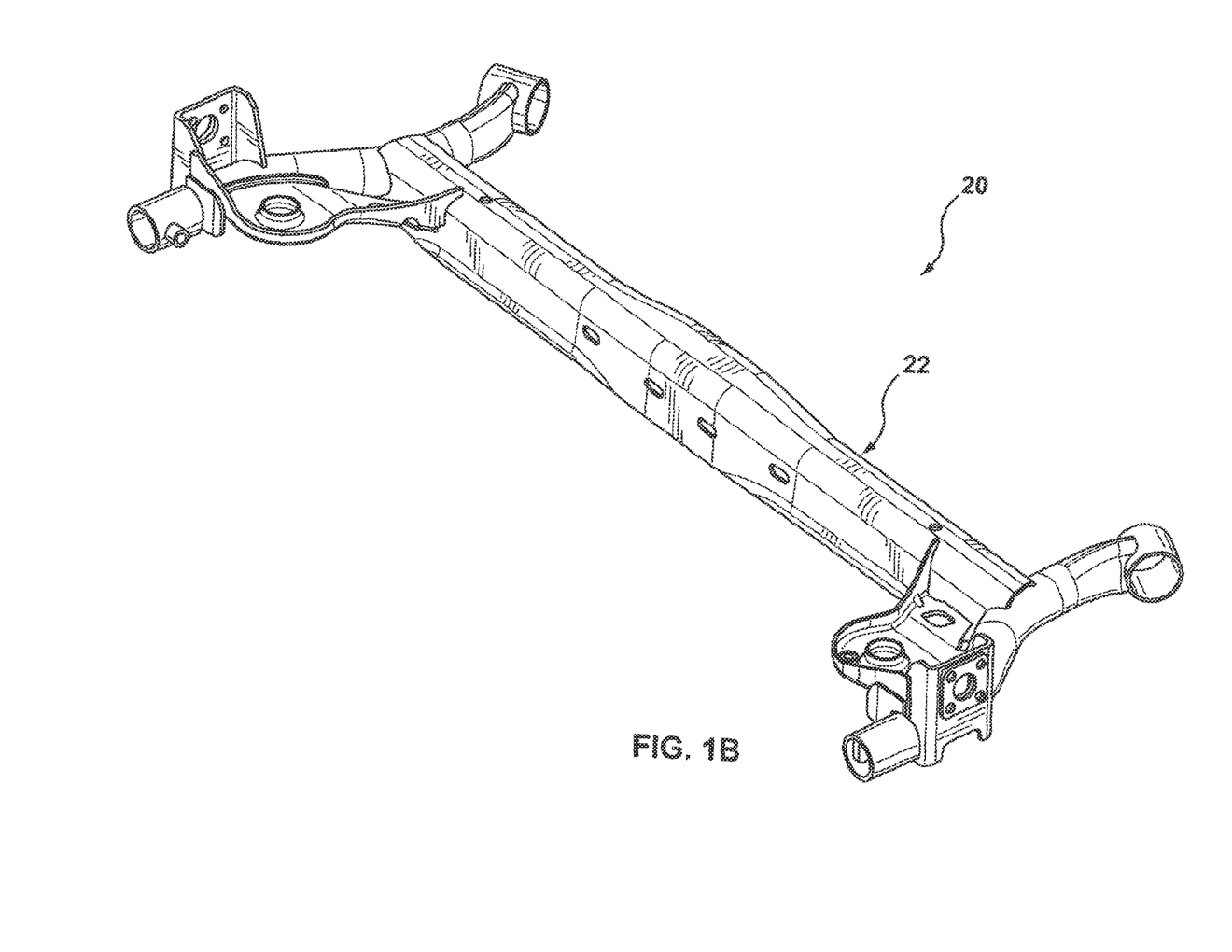
FIG. 1B is another view of the suspension assembly of FIG. 1A.

A suspension assembly 20 for an automotive vehicle according to one embodiment of the invention is generally shown in FIGS. 1A and 1B. The suspension assembly 20 is a rear suspension assembly and includes a twist beam 22 having an open, inverted U-shaped cross-section and a bulged middle section 24 to help meet roll stiffness requirements with less weight and a less complex manufacturing process, compared to twist beams formed with a stabilizer bar or a closed cross-section. The bulged middle section 24 is provided by an increase in width w, an increase in height h, or an increase in both the width w and the height h.

As shown in FIG. 1A, the suspension assembly 20 includes a first control arm 26 and a second control arm 28 each extending between opposite ends. The suspension assembly 20 also includes a first wheel mounting member 34 and a second wheel mounting member 36 aligned with one another and each connected to one end of the respective control arm 26, 28. A first spindle bracket 38 is connected to the first control arm 26 adjacent the end opposite the first wheel mounting member 34, and a second spindle bracket 39 is connected to the second control arm 28 adjacent the end opposite the second wheel mounting member 36. A first spring bracket 40 is connected to the first control arm 26 adjacent the first spindle bracket 38, and a second spring bracket 41 is connected to the second control arm 28 adjacent the second spindle bracket 39. The suspension assembly 20 also includes a first trailing arm 42 and a second trialing arm 43 each connected to the respective spindle bracket 38, 39 and extending opposite the respective control arm 26, 28.

The twist beam 22 of the suspension assembly 20 extends longitudinally along an axis A from a first end 30 connected to the first control arm 26 to a second end 32 connected to the second control arm 28. Although the twist beam 22 is shown in the rear suspension assembly 20 of FIGS. 1A and 1B, the twist beam 22 could be used in other types of suspension assemblies.

Figure 2A:
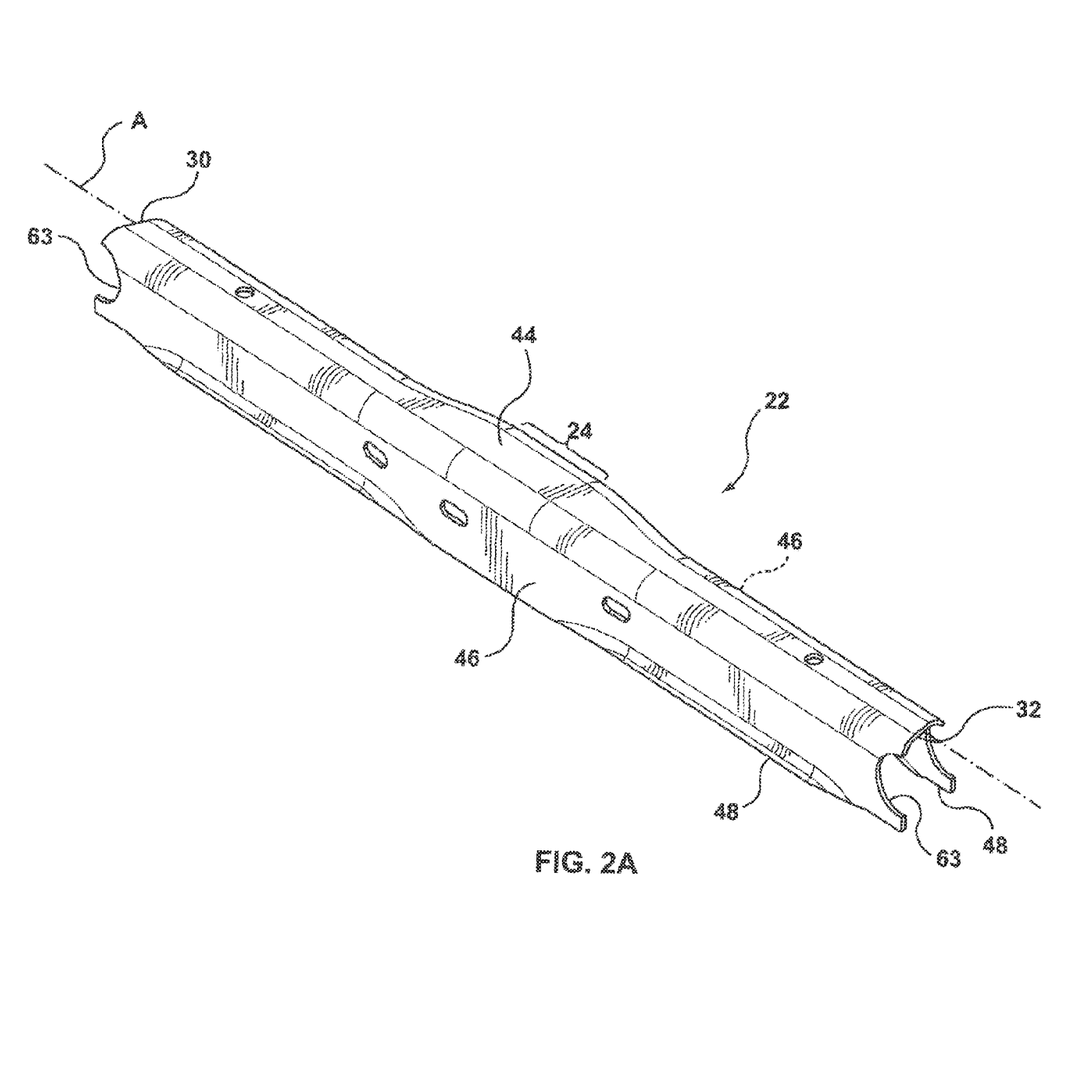
FIG. 2A is an isometric perspective view of the twist beam of the suspension assembly of FIG. 1A.
Figure 2B:
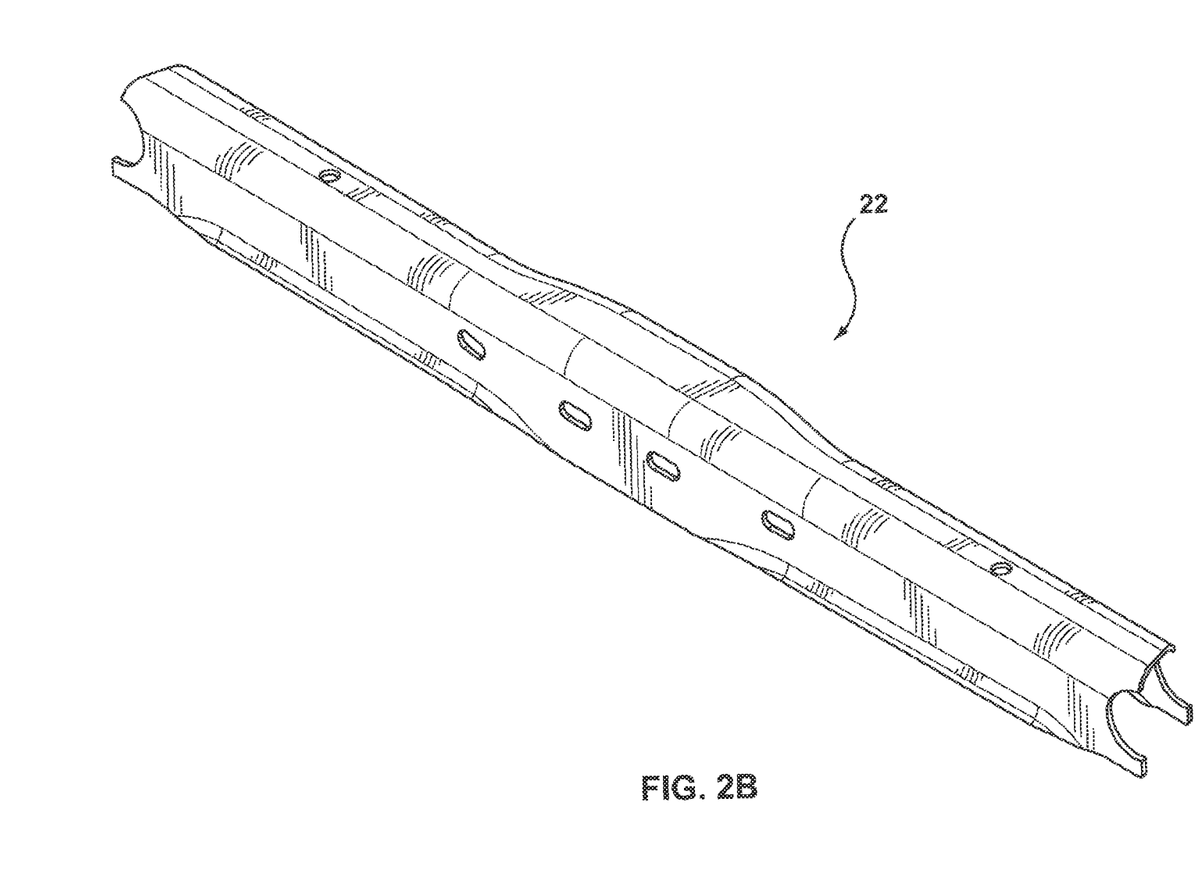
FIG. 2B is another view of the twist beam of FIG. 2A.
Figure 3A:
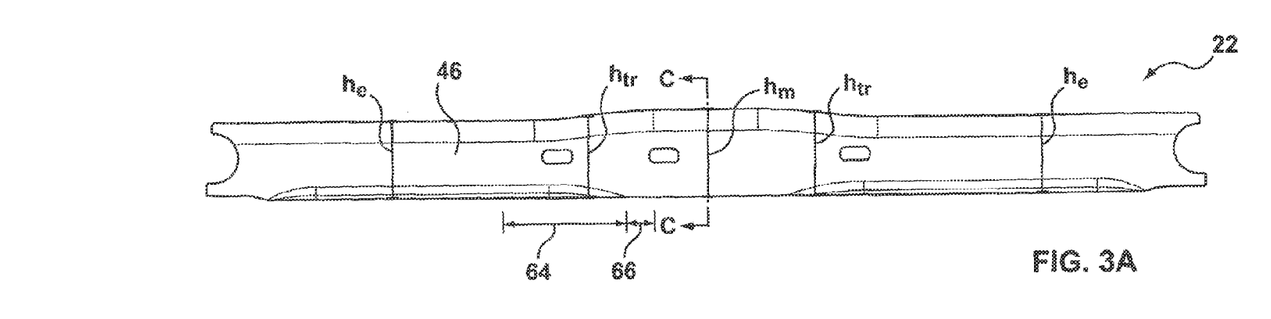
FIG. 3A is a front view of the twist beam of FIG. 2A.
Figures 3B, 3C:
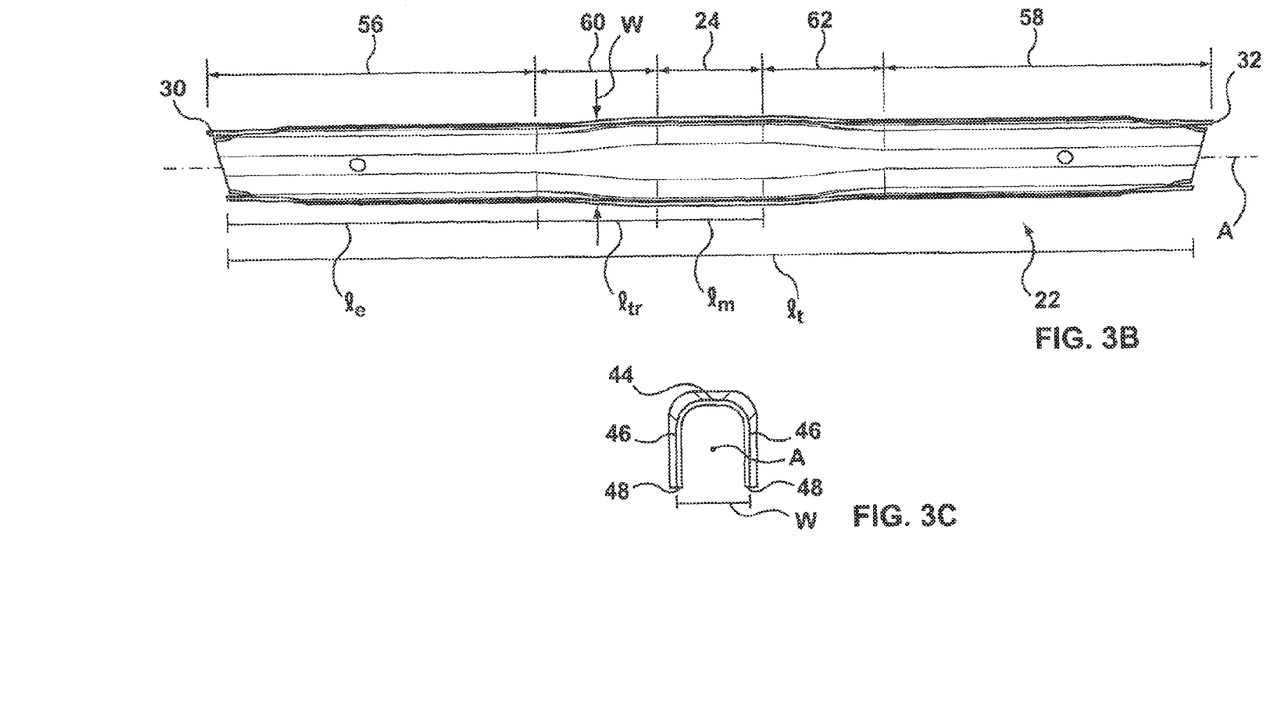
FIG. 3B is a top view of the twist beam of FIG. 2A.
FIG. 3C is a cross-sectional side view of the twist beam of FIG. 2A along line C-C.

As shown in FIG. 2A, the twist beam 22 includes a base portion 44 presenting an arcuate shape and extending longitudinally along the axis A from the first end 30 to the second end 32. The twist beam 22 also includes a pair of side walls 46 each extending longitudinally from the first end 30 to the second end 32 and being spaced from one another by the base portion 44. Each side wall 46 extends transversely form the base portion 44 to a side edge 48 such that the base portion 44 and the side walls 46 together present the inverted open U-shaped cross-section shown in FIGS. 3C, 4B and 4C. Although not shown, the base portion 44 and side walls 46 of the twist beam 22 could alternatively present an open V-shaped cross-section. As shown in FIG. 3B, the twist beam 22 has a total length $I_t$ extending between the opposite ends 30, 32, and is symmetric relative to a plane extending along the longitudinal axis A between the ends 30, 32.

Figure 4A:
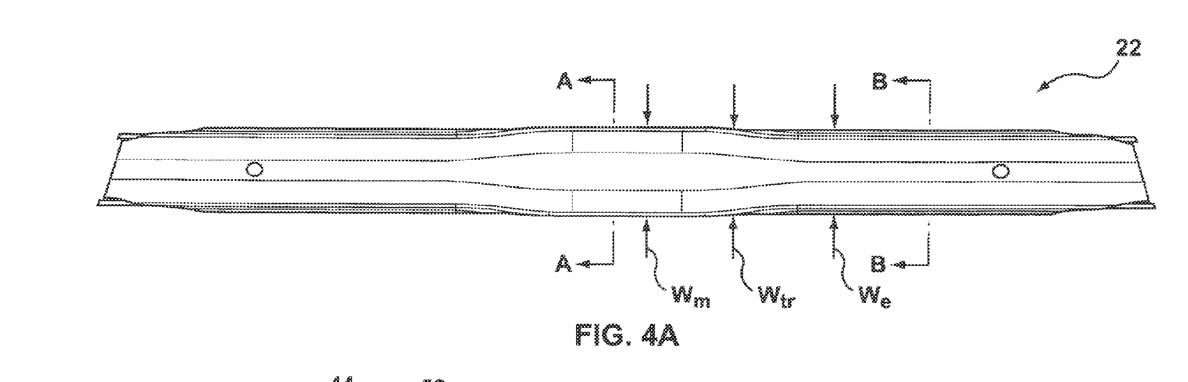
FIG. 4A is another top view of the twist beam of FIG. 2A showing width of the twist beam.
Figure 4B:
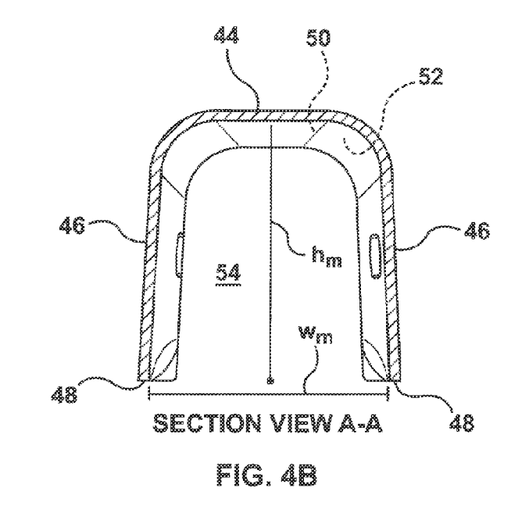
FIG. 4B is a cross-sectional view of the twist beam of FIG. 4A along line A-A.
Figure 4C:
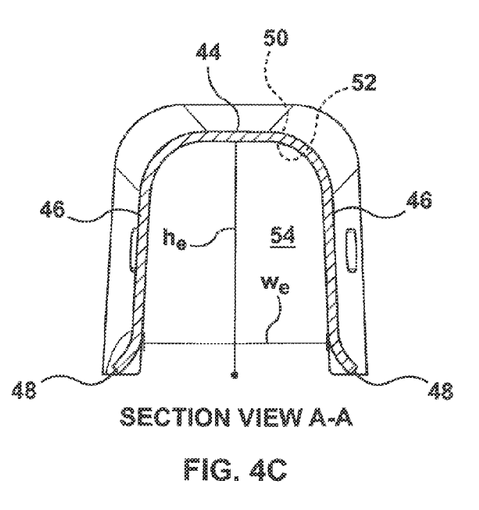
FIG. 4C is a cross-sectional view of the twist beam of FIG. 4A along line B-B.
Figure 5:
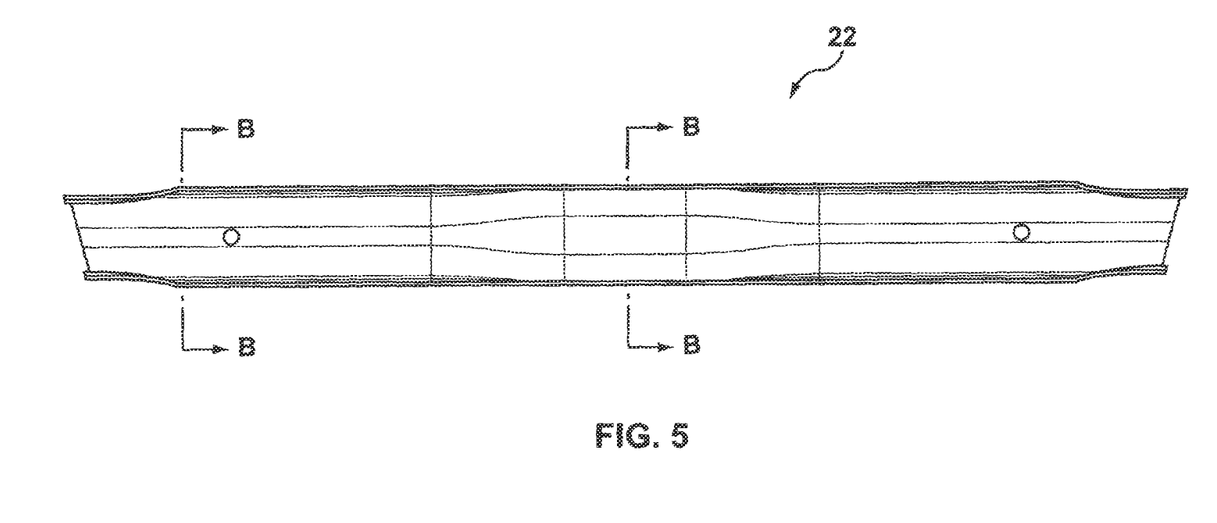
FIG. 5 is a top view of the twist beam of FIG. 2B.

The base portion 44 and the side walls 46 of the twist beam 22 together present an outer surface 50 and an oppositely facing inner surface 52 spaced from one another by the side edges 48, as shown in FIGS. 4B and 4C. The outer surface 50 of the base portion 44 is flat in a center area along the center axis and generally convex from the flat center area to the side walls 46. The inner surface 52 of the base portion 44 is also flat in a center area along the center axis A and generally concave from the flat center area to the side walls 46. The inner surface 52 presents a cavity 54 having a cross-sectional area and being open at the side edges 48.

Figure 2C:
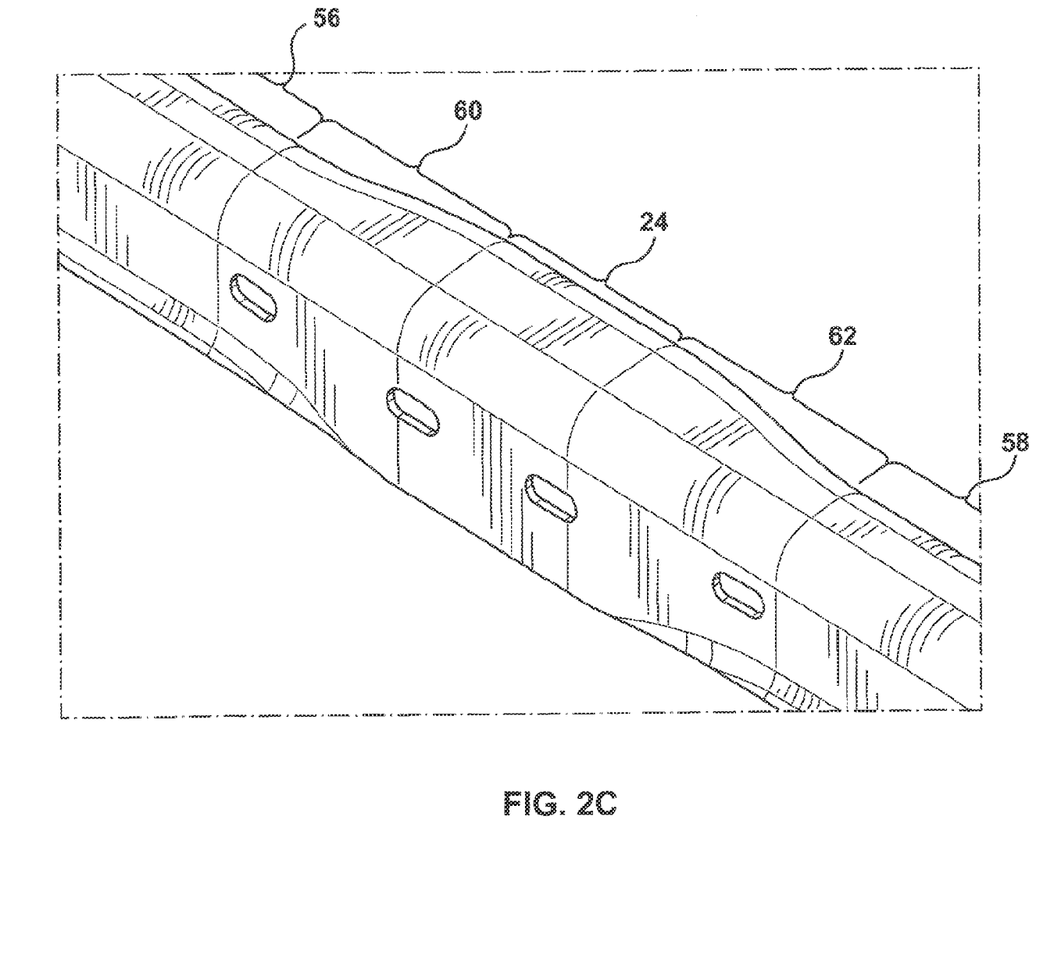
FIG. 2C is an enlarged view of the bulged middle section of the twist beam of FIG. 2B.

As shown in FIGS. 2C and 3B, the twist beam 22 includes a first end section 56 extending longitudinally from the first end 30 toward the second end 32, and a second end section 58 extending longitudinally from the second end 32 toward the first end 30. Each end section 56, 58 typically has a length $I_e$ equal to a portion of the total length $I_t$ of the twist beam 22. The twist beam 22 also includes a middle section 24 between the first end section 56 and the second end section 58. The middle section 24 typically has a length $I_m$ equal to a portion of the total length $I_t$ of the twist beam 22. A first transition section 60 extends from the first end section 56 to the middle section 24, and a second transition section 62 extends from the second end section 58 to the middle section 24. Each transition section 60, 62 typically has a length $I_{tr}$ equal to a portion of the total length $I_t$ of the twist beam 22. The cross-sectional area of the cavity 54 increases along the transition sections 60, 62 to provide the bulged middle section 24.

The length of the end sections 56, 58, transition sections 60, 62, and middle section 24 can vary depending on the required roll stiffness, manufacturing process, or for other reasons. Typically, the length $I_t$ of both transition sections 60, 62 and the length $I_m$ of the middle section 24 combined is equal to 15% to 40% of the total length $I_t$ of the twist beam 22. This combined length, i.e. the spread of the increased cross-sectional area, is tuned to achieve the required roll stiffness.

As shown in the FIGS. 3B and 4C, the side walls 46 project outwardly away from one another adjacent the side edges 48 along a majority of the length $I_e$ of the first end section 56 and along a majority of the length $I_e$ of the second end section 58. In these areas, the side walls 46 are straight from the base portion 44 toward the respective side edge 48 and project outwardly at an angle of 30-60 degrees away from one another directly adjacent the respective side edge 48. In the remaining area, adjacent the ends 30, 32 of the twist beam 22, the side walls 46 extend straight from the base portion 44 to the respective side edge 48, as shown in FIGS. 3B and 4B. The side walls 46 also define a socket 63 at each end 30, 32 for receiving one of the control arms 26, 28, as shown in FIGS. 1A and 2A.

In the middle section 24 of the twist beam 22, the side walls 46 are straight from the base portion 44 to the respective side edge 48, as shown in FIGS. 2A and 4B. As shown in FIGS. 3A and 3B, the side walls 46 of the transition sections 60, 62 include a first zone 64 adjacent one of the end sections 56, 58 and a second zone 66 between the respective first zone 64 and the middle section 24. The side walls 46 of the first zone 64 are straight from the base portion 44 toward the respective side edge 48 and then project outwardly away from the other side wall 46 adjacent the respective side edge 48, as shown in FIG. 4C. The side walls 46 of the second zone 66 are straight from the base portion 44 to the respective side edge 48, as shown in FIG. 4B.

Each section 24, 56, 58, 60, 62 has a width w extending transverse to the longitudinal axis A from one side wall 46 to the other side wall 46, as shown in FIGS. 3B, 3C, 4A, 4B, and 4C. If the width w varies along the side walls 46 or along the section 24, 56, 58, 60, 62, then the width w is the largest width along the side walls 46 or section 24, 56, 58, 60, 62, excluding any projecting portions adjacent of the side edges 48. Each end section 56, 58 includes a width $w_e$ which is typically constant along a majority of the end section 56, 58. The width $w_{tr}$ then increases along the transition sections 60, 62 from the end sections 56, 58 to the middle section 24, and the width $w_m$ is typically constant along the middle section 24 between the transition sections 60, 62. In the middle section 24, the width $w_m$ is greater than the width $w_e$ of the end sections 56, 58. However, the width $w_e$ of the end sections 56, 58, the width $w_{tr}$ of the transition sections 60, 62, and the width $w_m$ of the middle section 24 can vary depending on the required roll stiffness, manufacturing process, or for other reasons.

As shown in FIGS. 3A, 4B, and 4C, each section 24, 56, 58, 60, 62 has a height h extending transverse to the longitudinal axis A. The height h is measured from a point P between the side edges 48 to the base portion 44, as shown in FIGS. 4B and 4C. The point P is located an equal distance from each side edge 48. If the height h varies along the section 24, 56, 58, 60, 62, then the height h is equal to the greatest height along that section 24, 56, 58, 60, 62. The end sections 56, 58 have a height $h_e$ that is typically constant along a majority of the end sections 56, 58, then increases from the end sections 56, 58 to the middle section 24, and is constant along the middle section 24 between the transition sections 60, 62. The middle section 24 has a height $h_m$ that is greater than the height $h_e$ of the end sections 56, 58. However, the height $h_e$ of the end sections 56, 58, height $h_t$ of the transition sections 60, 62, and the height $h_m$ of the middle section 24 can vary depending on the required roll stiffness, manufacturing process, or for other reasons.

The bulged middle section 24 provided by the either the increased width w, the increased height h, or both the increased width w and increased height h, causes the cross-sectional area of the open cavity 54, shown in FIGS. 4B and 4C, along the middle section 24 to be greater than the cross-sectional area of the open cavity 54 along the end sections 56, 58. The cross-sectional area of the middle section 24 is tuned to achieve the desired roll stiffness. Typically, the cross-sectional area of the open cavity 54 along the middle section 24 is 10% to 30% greater than the cross-sectional area of the open cavity 54 along the end sections 56, 58. The size of the increase in cross-sectional area of the middle section 24 also depends on the manufacturing process used to form the twist beam 22.

According to one embodiment, as shown in FIG. 1A, the twist beam 22 defines a plurality of lightening holes 68 along the base portion 44 and along the side walls 46 to reduce the weight of the twist beam 22. The base portion 44 typically includes one lightening hole 68 in each of the end sections 56, 58. Each of the side walls 46 typically include one lightening hole 68 in each of the transition sections 60, 62 and one lightening hole 68 in the middle section 24.

Figure 6:
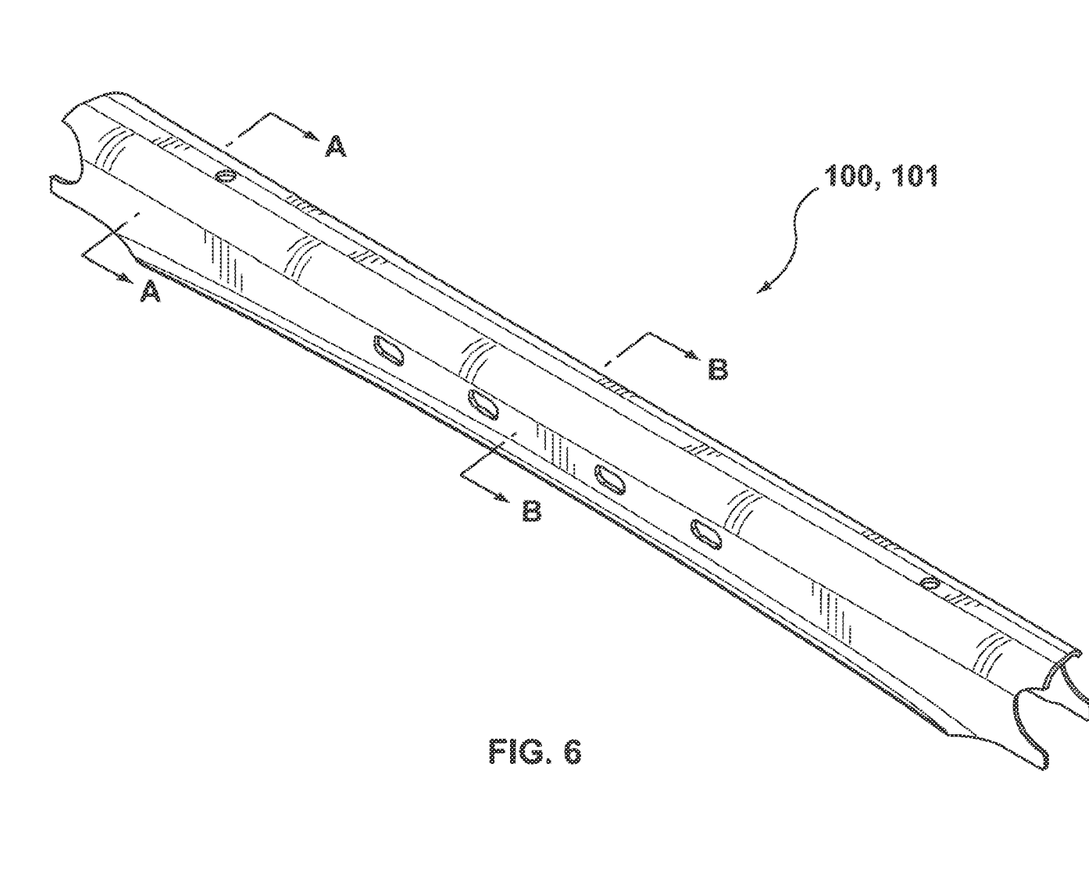
FIG. 6 is a perspective view of a comparative twist beam.
Figure 7A:
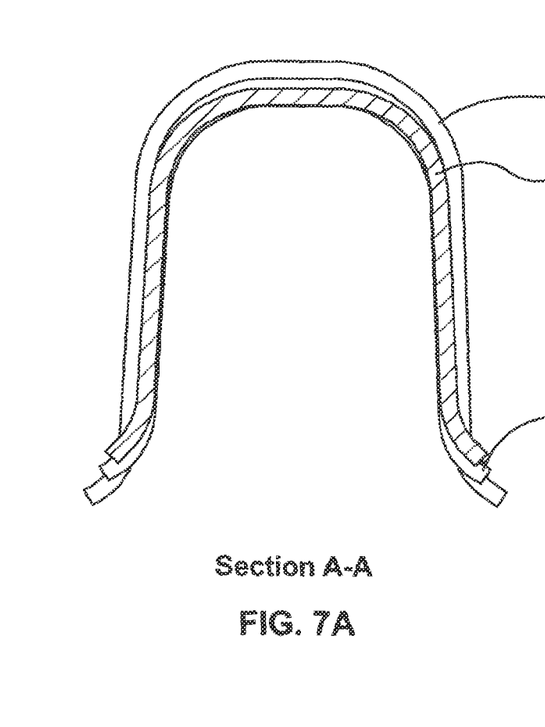
FIG. 7A illustrates a cross-section of the twist beam of FIG. 5 along line A-A relative to the cross-section of two comparative twist beams having the design of FIG. 6 along line A-A.
Figure 7B:
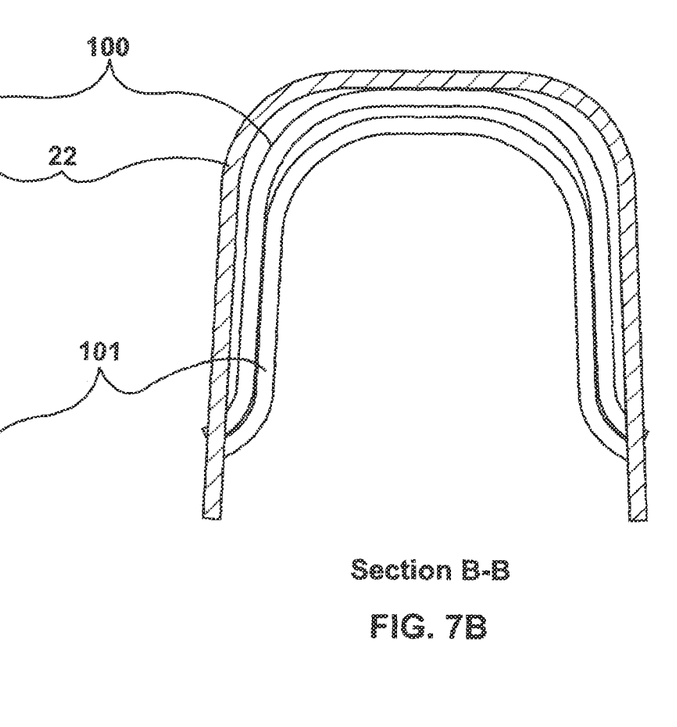
FIG. 7B illustrates a cross-section of the twist beam of FIG. 5 along line B-B relative to the cross-section of two comparative twist beams having the design of FIG. 6 along line B-B.

The twist beam 22 of the present invention provides an exceptional balance of weight and roll stiffness. The weight, thickness, and roll stiffness of the twist beam 22 of FIG. 2A with the bulged middle section 24 was compared to two twist beams having another design without the budged middle section 24. The two comparative twist beams 100, 101 had the general design shown in FIG. 6, but had slightly different cross-sections. The cross-sections of the inventive twist beam 22 and the two comparative twist beams 100, 101 are shown in FIGS. 7A and 7B. The twist beam 22 of the present invention had a weight of 8.0 kg, a thickness of 4 Mm, and a roll stiffness of 395 N-m/deg. The first comparative twist beam 100 had a weight of 9.12 kg, a thickness of 4.5 Mm, and a roll stiffness of 441 N-m/deg. The second comparative twist beam 101 had a weight of 7.4 kg, a thickness of 4 Mm, and a roll stiffness of 263 N-m/deg. These test results indicate the twist beam of the present invention provides significant reduction in weight compared to the first comparative twist beam and a significant improvement in the roll stiffness compared to the second comparative twist beam.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A twist beam, comprising:
   a base portion extending longitudinally along an axis between opposite ends;
   a pair of side walls spaced from one another by said base portion and each extending longitudinally along said axis between said opposite ends and transversely from said base portion to a side edge;
   said twist beam presenting a width between said side walls and a height extending from between said side edges to said base portion; and
   said width and said height being greater along a middle section of said twist beam than at said ends.

2. The twist beam of claim 1 including a pair of end sections, each one of said end sections extending longitudinally from one of said ends toward the opposite end; said middle section disposed between said end sections; and a pair of transition sections, each of said transition sections extending from one of said end sections to said middle section; and wherein at least one of said width and said height increases along said transition sections from said end sections to said middle section.

3. The twist beam of claim 2 presenting a total length between said opposite ends, and wherein a width of said end sections is constant along a majority of a length of said end sections, and a width of said middle section is greater than said width along said majority of said length of said end sections.

4. The twist beam of claim 2 presenting a total length between said opposite ends, and wherein a height of said end sections is constant along a majority of a length of said end sections, and a height of said middle section is greater than said height along said majority of said length of said end sections.

5. The twist beam of claim 2 presenting a total length between said opposite ends, and wherein each of said end sections have a length equal to a portion of said total length; said middle section has a length equal to a portion of said total length; each of said transition sections have a length equal to a portion of the total length; and said length of both said transition sections and said length of said middle section combined is equal to 15% to 40% of said total length.

6. The twist beam of claim 2 wherein said base portion and said side walls together present an outer surface and an oppositely facing inner surface spaced from one another by said side edges, said inner surface presents a cavity being open at said side edges, and wherein the cross-sectional area of said open cavity along said middle section is 10% to 30% greater than the cross-sectional area of said open cavity along said end sections.

7. The twist beam of claim 2 wherein said side walls of said middle section are straight from said base portion to said side edges; and said side walls along at least a portion of said end sections are straight from said base portion toward said side edges and project outwardly away from one another adjacent said side edges.

8. The twist beam of claim 1 wherein said base portion presents an arcuate shape.

9. The twist beam of claim 8 wherein said base portion and said side walls together present a cross-section having an open U-shape.

10. The twist beam of claim 1 wherein said base portion includes a plurality of lightening holes.

11. A twist beam, comprising:
a base portion extending longitudinally along an axis between opposite ends;
a pair of side walls spaced from one another by said base portion and each extending longitudinally along said axis between said opposite ends and transversely from said base portion to a side edge;
said twist beam presenting a width between said side walls and a height extending from between said side edges to said base portion;
at least one of said width and said height being greater along a middle section of said twist beam than at said ends;
a pair of end sections, each one of said end sections extending longitudinally from one of said ends toward the opposite end;
said middle section disposed between said end sections;
a pair of transition sections, each of said transition sections extending from one of said end sections to said middle section; and
wherein both said width and said height increase along said transition sections from said end sections to said middle section.

12. A twist beam, comprising:
a base portion extending longitudinally along an axis between opposite ends;
a pair of side walls spaced from one another by said base portion and each extending longitudinally along said axis between said opposite ends and transversely from said base portion to a side edge;
said twist beam presenting a width between said side walls and a height extending from between said side edges to said base portion;
at least one of said width and said height being greater along a middle section of said twist beam than at said ends;
a pair of end sections, each one of said end sections extending longitudinally from one of said ends toward the opposite end, wherein said middle section is disposed between said end sections;
a pair of transition sections, each of said transition sections extending from one of said end sections to said middle section, wherein both said width and said height increase along said transition sections from said end sections to said middle section; and
wherein said opposite ends present a total length therebetween, a width of said end sections is constant along a majority of a length of said end sections, a width of said middle section is greater than said width along said majority of said length of said end sections, a height of said end sections is constant along a majority of a length of said end sections, and a height of said middle section is greater than said height along said majority of said length of said end sections.

13. The twist beam of claim 12 wherein a length of both said transition sections and said middle section combined is equal to 15% to 40% of said total length;
said base portion and said side walls together present an outer surface and an oppositely facing inner surface spaced from one another by said side edges;
said inner surface presents a cavity being open at said side edges, and the cross-sectional area of said open cavity along said middle section is 10% to 30% greater than the cross-sectional area of said open cavity along said end sections;
said side walls of said middle section are straight from said base portion to said side edges; and
said side walls along at least a portion of said end sections are straight from said base portion toward said side edges and project outwardly away from one another adjacent said side edges.

14. The twist beam of claim 13 wherein said base portion presents an arcuate shape.

15. A suspension assembly comprising:
a twist beam including a base portion and a pair of side walls;
said base portion extending longitudinally along an axis between opposite ends;
said pair of side walls spaced from one another by said base portion and each extending longitudinally along said axis between said opposite ends and transversely from said base portion to a side edge; and
said twist beam presenting a width between said side walls and a height extending from between said side edges to said base portion, and said width and said height being greater along a middle section of said twist beam than at said ends.

16. The suspension assembly of claim 15 wherein said twist beam extends between a first control arm and a second control arm.

17. The suspension assembly of claim 16 including a pair of wheel mounting members, each wheel mounting member being connected to one of said control arms; a pair of spindle brackets each connected to one of said control arms; a pair of spring brackets each connected to one of said control arms; and a pair of trailing arms each connected to said respective spindle bracket.

18. A suspension assembly comprising:
a twist beam including a base portion and a pair of side walls;
said base portion extending longitudinally along an axis between opposite ends;
said pair of side walls spaced from one another by said base portion and each extending longitudinally along said axis between said opposite ends and transversely from said base portion to a side edge;
said twist beam presenting a width between said side walls and a height extending from between said side edges to said base portion, at least one of said width and said height being greater along a middle section of said twist beam than at said ends, and
wherein said twist beam includes a pair of end sections, each one of said end sections extending longitudinally from one of said ends toward the opposite end, wherein said middle section is disposed between said end sections;
a pair of transition sections, each of said transition sections extending from one of said end sections to said middle section, wherein both said width and said height increase along said transition sections from said end sections to said middle section; and
wherein said opposite ends present a total length therebetween, a width of said end sections is constant along a majority of a length of said end sections, a width of said middle section is greater than said width along said majority of said length of said end sections, a height of said end sections is constant along a majority of a length of said end sections, and a height of said middle section is greater than said height along said majority of said length of said end sections.

19. The suspension assembly of claim 18 wherein a length of both said transition sections and said middle section of said twist beam combined is equal to 15% to 40% of said total length;

said base portion and said side walls together present an outer surface and an oppositely facing inner surface spaced from one another by said side edges;

said inner surface presents a cavity being open at said side edges, and the cross-sectional area of said open cavity along said middle section is 10% to 30% greater than the cross-sectional area of said open cavity along said end sections;

said side walls of said middle section are straight from said base portion to said side edges; and said side walls along at least a portion of said end sections are straight from said base portion toward said side edges and project outwardly away from one another adjacent said side edges.

\* \* \* \* \*